United States Patent
Sibbach et al.

(10) Patent No.: US 12,253,023 B1
(45) Date of Patent: Mar. 18, 2025

(54) TURBINE ENGINE INCLUDING A GAS PATH COMPONENT HAVING A HYDROPHOBIC COATING

(71) Applicant: General Electric Company, Schenectady, NY (US)

(72) Inventors: Arthur W. Sibbach, Boxford, MA (US); Rajesh Kumar, Bengaluru (IN); Jeffrey D. Rambo, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/468,198

(22) Filed: Sep. 15, 2023

(51) Int. Cl.
*F02C 3/06* (2006.01)
*F02C 3/30* (2006.01)

(52) U.S. Cl.
CPC ............... *F02C 3/30* (2013.01); *F02C 3/06* (2013.01); *F05D 2240/35* (2013.01); *F05D 2260/2322* (2013.01); *F05D 2260/609* (2013.01); *F05D 2300/21* (2013.01); *F05D 2300/512* (2013.01); *F05D 2300/611* (2013.01)

(58) Field of Classification Search
CPC .......... F02C 3/30; F02C 3/06; F05D 2240/35; F05D 2260/2322; F05D 2260/609; F05D 2300/21; F05D 2300/512; F05D 2300/611
See application file for complete search history.

(56) References Cited

U.S. PATENT DOCUMENTS

| | | |
|---|---|---|
| 5,687,776 A | 11/1997 | Forgash et al. |
| 5,896,740 A | 4/1999 | Shouman |
| 7,977,267 B2 | 7/2011 | Gentleman et al. |
| 8,062,775 B2 | 11/2011 | Gentleman et al. |
| 8,178,219 B2 | 5/2012 | Gentleman et al. |

(Continued)

FOREIGN PATENT DOCUMENTS

| | | |
|---|---|---|
| CN | 110542343 A | 12/2019 |
| FR | 3127269 A1 | 3/2023 |

(Continued)

OTHER PUBLICATIONS

Coatings for Enhanced Heat Exchanger and Filtration Performance, Silcotek Corporation 2021.*

(Continued)

*Primary Examiner* — Todd E Manahan
*Assistant Examiner* — Rodolphe Andre Chabreyrie
(74) *Attorney, Agent, or Firm* — Venable LLP; David D. Leege; Michele V. Frank

(57) ABSTRACT

A turbine engine for an aircraft. The turbine engine includes a combustor and a steam system. Fuel and steam are injected into the combustor to mix with compressed air to generate a fuel and air mixture. The fuel and air mixture is combusted in the combustor to generate combustion gases. The steam system is fluidly coupled to the combustor as the steam source to provide steam to the combustor. The steam system includes a hot gas path and a steam hot gas path component. The hot gas path is fluidly coupled to the combustor to receive the combustion gases and to route the combustion gases through the steam system. The steam hot gas path component includes a wall having a combustion-gas-facing surface facing the hot gas path and a hydrophobic coating formed on the combustion-gas-facing surface.

20 Claims, 5 Drawing Sheets

(56) References Cited

U.S. PATENT DOCUMENTS

| | | | |
|---|---|---|---|
| 8,222,172 | B2 | 7/2012 | Gentleman et al. |
| 8,497,029 | B2 | 7/2013 | Gentleman et al. |
| 9,932,124 | B2 | 4/2018 | Kamath et al. |
| 10,557,672 | B2 | 2/2020 | Kim et al. |
| 10,890,383 | B2 | 1/2021 | Sun et al. |
| 11,221,184 | B1 | 1/2022 | Weed et al. |
| 11,397,029 | B2 | 7/2022 | Miller |
| 11,603,798 | B1 | 3/2023 | Terwilliger et al. |
| 11,619,455 | B2 | 4/2023 | He et al. |
| 2010/0151264 | A1* | 6/2010 | Gentleman ............ C23C 30/00 136/256 |
| 2010/0313578 | A1* | 12/2010 | Robidou .................. F17C 9/02 60/407 |
| 2011/0173948 | A1* | 7/2011 | Fujita ..................... F02C 7/141 122/1 C |
| 2014/0182264 | A1 | 7/2014 | Weisgerber et al. |
| 2017/0350320 | A1* | 12/2017 | Kippel .................. F01D 25/12 |
| 2018/0306533 | A1 | 10/2018 | Alahyari et al. |
| 2023/0258126 | A1* | 8/2023 | Terwilliger ............ F02C 1/005 60/39.182 |
| 2023/0332522 | A1* | 10/2023 | Klingels ................ F02C 7/141 |

FOREIGN PATENT DOCUMENTS

| | | | |
|---|---|---|---|
| FR | 3130896 | A1 | 6/2023 |
| FR | 3130897 | A1 | 6/2023 |
| FR | 3133367 | A1 | 9/2023 |
| FR | 3133368 | A1 | 9/2023 |
| JP | 2016510376 | A | 4/2016 |

OTHER PUBLICATIONS

Silcotek.*
Energies 2021, 14, 3402 (Year: 2021).*
Coating Properties.*
Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.
MTU Aero Engines, "Water-enhanced turbofan," available at https://www.mtu.de/technologies/clean-air-engine/water-enhanced-turbofan/, as viewed on Jun. 30, 2023.
Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.
Slides from Sustainable Water-Injecting Turbofan Comprising Hybrid-Electrics (SWITCH) Introduction at the 2023 NPSS Annual Consortium Meeting, Mar. 10, 2023.
Dursan® Data Sheet, available at <https://www.silcotek.com/hubfs/Literature%20Catalog/Data%20Sheets/DATA-DURSAN.pdf> (accessed Jun. 25, 2025).

* cited by examiner

US 12,253,023 B1

TURBINE ENGINE INCLUDING A GAS PATH COMPONENT HAVING A HYDROPHOBIC COATING

TECHNICAL FIELD

The present disclosure relates generally to turbine engines, particularly, turbine engines for aircraft.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 3A shows a first hydrophobic coating configuration. FIG. 3B shows a second hydrophobic coating configuration. FIG. 3C shows a third hydrophobic coating configuration.

DETAILED DESCRIPTION

Figure 1:
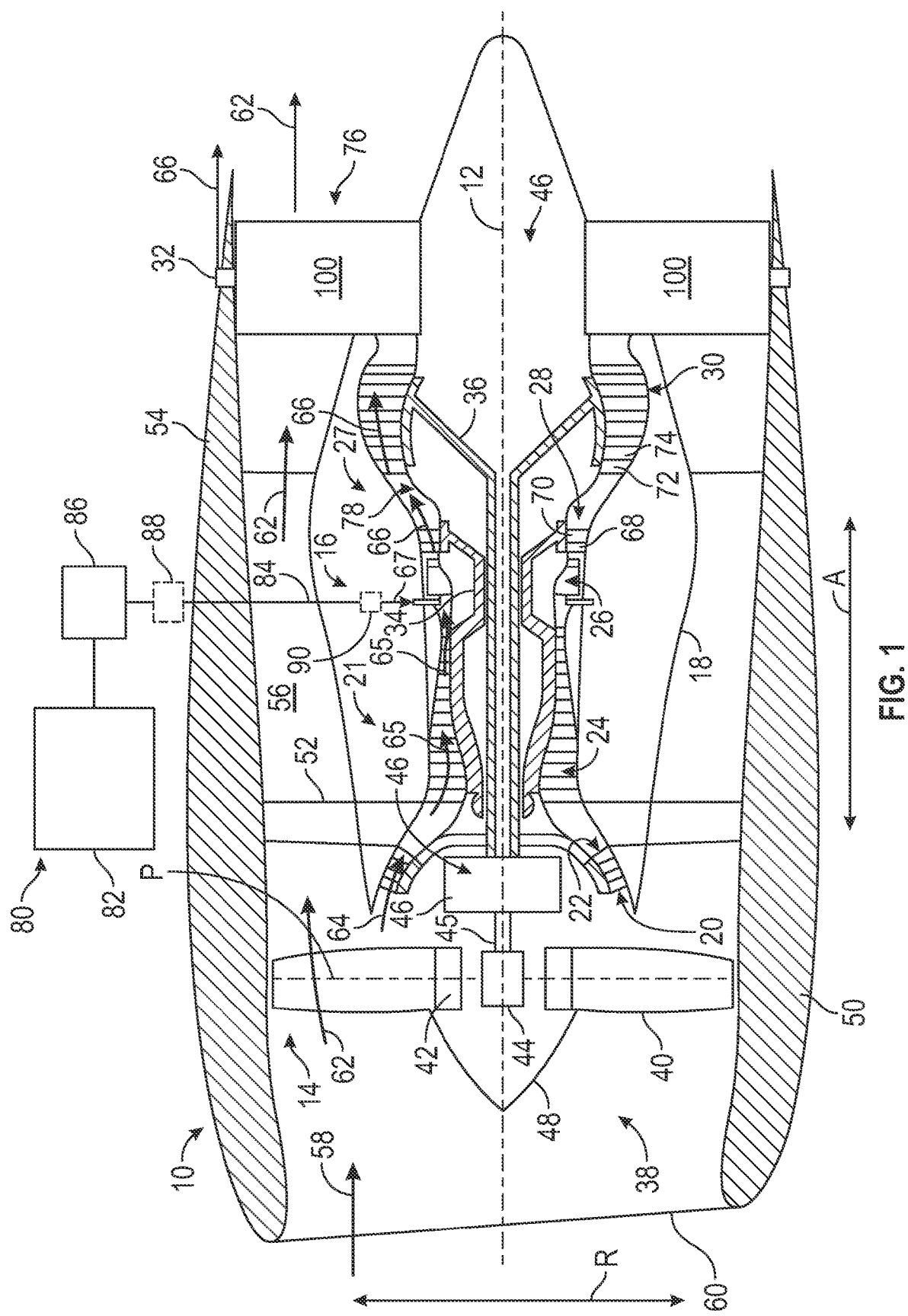
FIG. 1 is a schematic cross-sectional diagram of a turbine engine including a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide explanation without limiting the scope of the disclosure as claimed.

Various embodiments of the present disclosure are discussed in detail below.

While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "bypass ratio" of a turbine engine is a ratio of bypass air through a bypass of the turbine engine to core air through a core inlet of a core turbine engine of the turbine engine. For example, the bypass ratio is a ratio of bypass air 62 entering the bypass airflow passage 56 to core air 64 entering the core turbine engine 16.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. After flowing through the steam turbine, the steam may be injected into the combustor. Water from the steam thus flows with combustion gases through a hot gas path downstream of the combustor and comes into contact with various hot gas path components. Heat from the combustion gasses may be used to generate the steam and also the water is condensed from the combustion gasses. Accordingly, the hot gas path components may include, for example, heat exchangers and a water separator. With the steam in the combustion gases, these components are exposed to water leading to potential corrosion concerns and icing concerns, such as when the engine is shut down overnight in sub-freezing conditions. To minimize the impact of water on these components, the hot gas path components discussed herein include a hydrophobic coating applied to an outer surface thereof.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a core turbine engine 16 disposed downstream from the fan section 14.

The core turbine engine 16 includes an outer casing 18 that is substantially tubular and defines an annular inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustor 26, the turbine section 27, and the one or more core exhaust nozzles 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the core air flow path, or, more specifically, into the annular inlet 20 of the LPC 22. The ratio between the first portion of air (bypass air 62) and the second portion of air (core air 64) is known as a bypass ratio. In some embodiments, the bypass ratio is greater than 18:1, enabled by a steam system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (i.e., combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 (see FIG. 1) via the gearbox assembly 46. One or more stages may be used in each of the HPT 28 and the LPT 30. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the core turbine engine 16 to provide propulsive thrust. Simultaneously with the flow of the core air 64 through the core air flow path, the bypass air 62 is routed through the bypass airflow passage 56 before being exhausted from a fan bypass nozzle 76 of the turbine engine 10, also providing propulsive thrust. The combustor 26, the HPT 28, the LPT 30, and the one or more core exhaust nozzles 32 at least partially define a hot gas path 78 for routing the combustion gases 66 through the core turbine engine 16.

As noted above, in FIG. 1, the compressed air 65 (i.e., the core air 64) is mixed with the fuel 67 in the combustor 26 to generate a fuel and air mixture, and combusted, generating combustion gases 66 (i.e., combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel (H₂), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
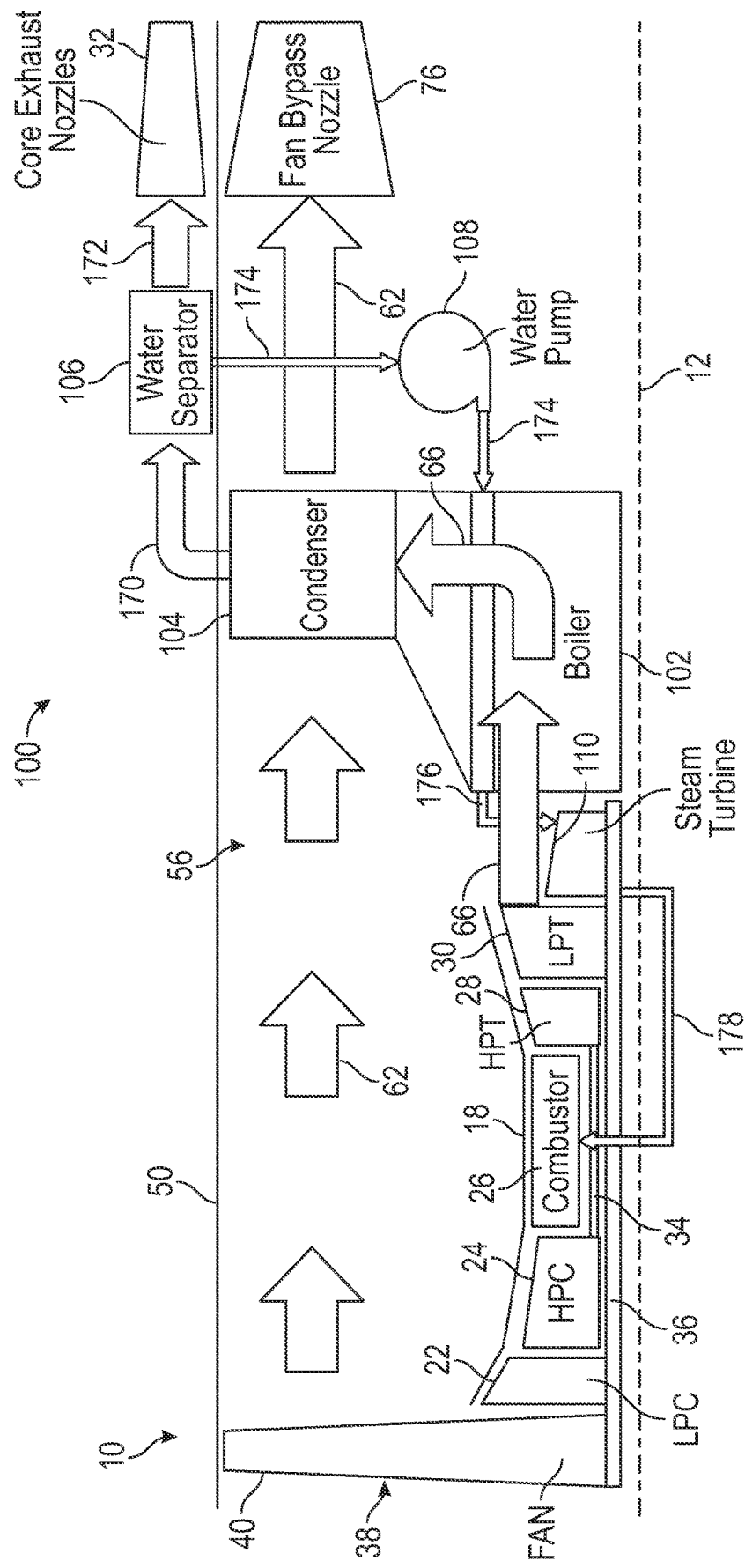
FIG. 2 is a schematic diagram of the turbine engine and a steam system according to an embodiment of the present disclosure.

FIG. 2 is a schematic diagram of the turbine engine 10 having a steam system, according to an embodiment of the present disclosure. The steam system 100 may be used as the steam system 100 in the turbine engine 10 shown in FIG. 1. For clarity, various features of the turbine engine 10 described and shown above are shown schematically in FIG. 2 and some components are not shown in FIG. 2, but the description of such components also applies here. The steam system 100 includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and, in this embodiment, is positioned within the bypass airflow passage 56. The condenser 104, however, may be positioned elsewhere and thermally connected to other cooling sources, such as being thermally connected to the fuel 67 to transfer heat to the fuel 67, particularly, when the fuel 67 is a cryogenic fuel such as hydrogen fuel. The condenser 104 can include any type of condenser for condensing water (e.g., in liquid form) from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the core turbine engine 16. The water separator 106 may be driven to rotate by one of the core shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water through the boiler 102 where it is converted back to steam. This steam is sent through the steam turbine 110 then injected into the combustor 26.

In operation, the combustion gases 66, also referred to as exhaust, flow from the LPT 30 into the boiler 102. The combustion gases 66 transfer heat into the water 174 (e.g., in liquid form) within the boiler 102, as detailed further below. The combustion gases 66 then flow into the condenser 104. The condenser 104 condenses the water 174 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 174 from the combustion gases 66, to generate an exhaust-water mixture 170. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 170 flows into the water separator 106. The water separator 106 separates the water 174 from the exhaust of the exhaust-water mixture 170 to generate separate exhaust 172 and the water 174. The exhaust 172 is exhausted out of the turbine engine 10 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 170, and the exhaust 172 through the steam system 100 of the turbine engine 10.

The water pump 108 pumps the water 174 (e.g., in liquid form) through one or more water lines (as indicated by the arrow for the water 174 in FIG. 2) and the water 174 flows through the boiler 102. As the water 174 flows through the boiler 102, the combustion gases 66 flowing through the boiler 102 transfer heat into the water 174 to vaporize the water 174 and to generate the steam 176 (e.g., vapor). The steam turbine 110 includes one or more stages of steam turbine blades (not shown) and steam turbine stators (not shown). The steam 176 flows from the boiler 102 into the steam turbine 110, through one or more steam lines (as indicated by the arrow for the steam 176 in FIG. 2), causing the steam turbine blades of the steam turbine 110 to rotate, thereby generating additional work in an output shaft (e.g., one of the core shafts) connected to the turbine blades of the steam turbine 110.

As noted above, the core turbine engine 16 includes shafts, also referred to as core shafts, coupling various rotating components of the core turbine engine 16 and other thrust producing components such as the fan 38. In the core turbine engine 16 shown in FIG. 1, these core shafts include the HP shaft 34 and the LP shaft 36. The steam turbine 110 is coupled to one of the core shafts of the core turbine engine 16, such as the HP shaft 34 or the LP shaft 36. In the illustrated embodiment, the steam turbine 110 is coupled to the LP shaft 36. As the steam 176 flows from the boiler 102 through the steam turbine 110, the kinetic energy of this gas is converted by the steam turbine 110 into mechanical work in the LP shaft 36. The reduced temperature steam (as steam 178) exiting the steam turbine 110 is then injected into, or upstream of, combustor 26. The steam 178 flows through one or more steam lines from the steam turbine 110 to the combustor 26. The steam 178 injected into the combustor 26 adds mass flow to the core air 64 such that less core air 64 is needed to produce the same amount of work through the turbine section 27. In this way, the steam system 100 extracts additional work from the heat in exhaust gas that would otherwise be wasted. The steam 178 injected into the combustor 26 is in a range of 20% to 50% of the mass flow through the core air flow path.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the steam system 100 recovers approximately 70% of the water 174 and converts the water 174 into the steam 176. The steam turbine 110 has a pressure expansion ratio in a range of 2:1 to 6:1, the LPT 30 has a pressure expansion ratio in a range of 4.5:1 to 28:1, and the steam 178 contributes to 20% to 50% of the mass flow through the core air flow path. The steam turbine 110 expands the steam 176, thereby reducing the energy of the steam 178 exiting the steam turbine 110 and reducing the temperature of the steam 178 to approximately a temperature of the compressed air 65 (see FIG. 1) that is discharged from the HPC 24. Such a configuration enables the steam 178 to reduce hot spots in the combustor 26 from the combustion of the fuel (e.g., in particular when the fuel is supercritical hydrogen or gaseous hydrogen).

The steam 178 injected into the combustor 26 also enables the HPT 28 to have a greater energy output with fewer stages of the HPT 28 as compared to HPTs without the benefit of the present disclosure. For example, the additional mass flow from the steam 178 through the turbine section 27 (FIG. 1) helps to produce a greater energy output. In this way, HPT 28 may only have one stage capable of sustainably driving a higher number of stages of the HPC 24 (e.g., 10, 11, or 12 stages of the HPC 24) due to the higher mass flow (resulting from the steam injection) exiting the combustor 26. The steam 176 that is injected into the combustor 26 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 176, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the core turbine engine 16 provided by the steam injection. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves are preferably positioned between a fourth stage of the HPC 24 and a last stage of the HPC 24. The HPC stator vanes that are variable stator vanes, and the one or more compressor bleed valves help to balance the air flow (e.g., the compressed air 65) through all stages of the HPC 24. Such a balance, in combination with the steam 176 injected into the combustor 26 to flow through the core air flowpath 33, enables the number of stages of the HPC 24 to include ten to twelve stages for compression ratios greater than 20:1, and preferably in a range of 20:1 to 40:1.

The additional work that is extracted by the steam system 100 and the steam 178 injected into the combustor 26 enables a size of the core turbine engine 16 (FIG. 1) to be reduced, which increases the bypass ratio of the turbine engine 10, as compared to turbine engines without the benefit of the present disclosure. In this way, the turbine engine 10 has a bypass ratio greater than 18:1, preferably, in a range of 18:1 to 100:1, more preferably, in a range of 25:1 to 85:1, and, most preferably, in a range of 28:1 to 70:1. In this way, the steam system 100 can enable an increased bypass ratio in which the turbine engine 10 can move a larger mass of air through the bypass, reducing the pressure ratio of the fan 38 (FIG. 1) and increasing the efficiency of the turbine engine 10 as compared to turbine engines without the benefit of the present disclosure.

As noted above in FIG. 1, the fuel 67 is combusted in the combustor 26 and, more specifically, a combustion chamber (not shown) of the combustor 26, generating the combustion gases 66. The combustion chamber may be defined by a combustion liner having an inner surface. Combustion occurs at high temperatures, such as from two thousand degrees Fahrenheit (2000° F.) (one thousand ninety-three degrees Celsius (1093° C.) to three thousand six hundred degrees Fahrenheit (3600° F.) (one thousand nine hundred eighty-two degrees Celsius (1982° C.)), and thus these combustion gases 66 are also at similar high temperatures. Reactive fuels, such as the hydrogen fuel discussed herein, combust at the high end of this range. The components within the hot gas path 78 that are directly exposed to the combustion gases 66 are referred to as hot gas path components. The combustion gases 66 flow from the combustor 26 to the core exhaust nozzles 32 in the manner discussed above. The components within the hot gas path 78 that are directly exposed to the combustion gases 66 are referred to as hot gas path components. The hot gas path components may include core hot gas path components and steam hot gas path components. As used herein, those components of the hot gas path 78 within the steam system 100 are referred to as steam hot gas path components 120 (see FIGS. 3 and 4), distinguishing them from other components, such as those of the core turbine engine 16 (core hot gas path components) that are upstream of the steam system 100. In this embodiment, the steam hot gas path components 120 may include any component of the steam system 100 within the hot gas path 78 that is downstream of the LPT 30. Non-limiting examples of the steam hot gas path components 120 include the boiler 102, the condenser 104, the water separator 106. The core exhaust nozzles 32 are also downstream of the LPT 30, and, for the purposes discussed herein, may also be an example of a steam hot gas path component 120.

Figure 3A:
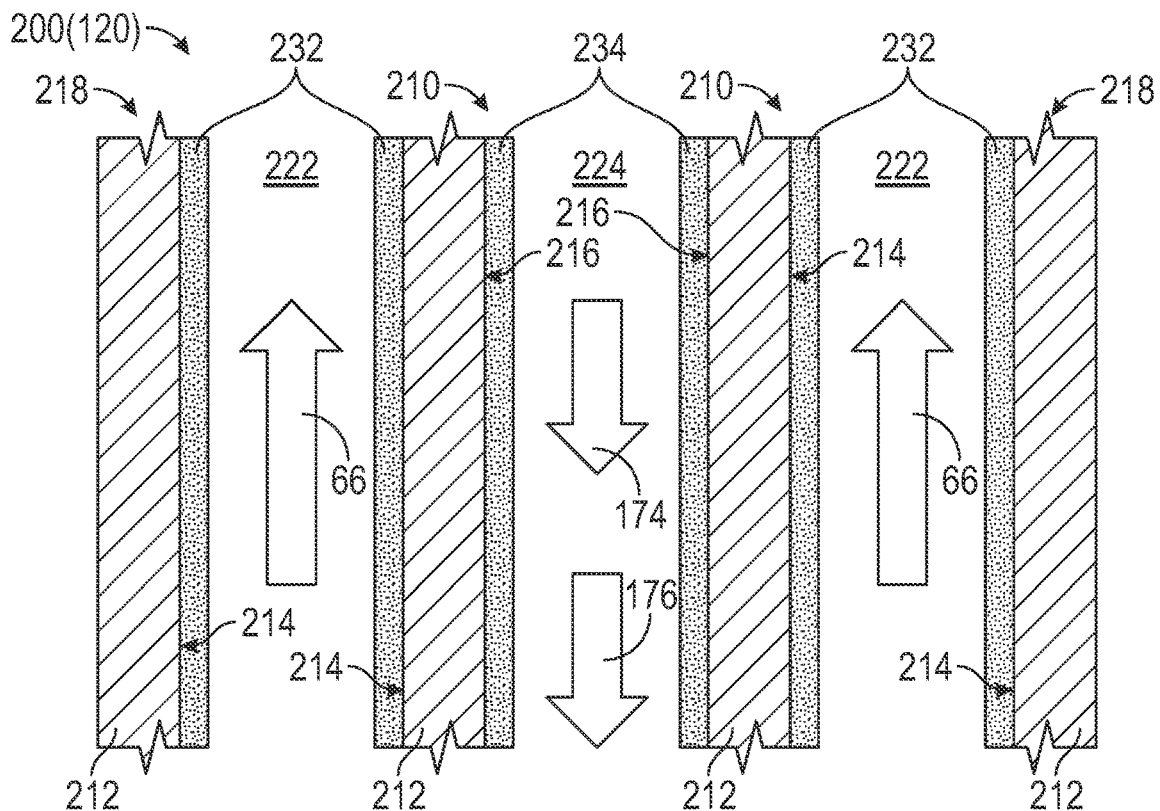
FIGS. 3A to 3C are schematic, cross-sectional views of heat exchangers that may be used in steam system shown in FIG. 2.

FIG. 3A is a schematic, cross-sectional view of a heat exchanger 200 of the steam system 100 (FIG. 2). More specifically, the heat exchanger 200 illustrated in FIG. 3A may be the boiler 102 (FIG. 2). The heat exchanger 200, however, is provided by way of an example of a steam hot gas path component 120. The discussion of the heat exchanger 200 may also be applicable to other steam hot gas path components 120 within the steam system 100, such as, other heat exchangers like the condenser 104, and other components of the steam system 100, such as the water separator 106 and the core exhaust nozzles 32 (FIG. 2).

As noted above, the boiler 102 is a plate heat exchanger including a plurality of plates 210 separating flow paths for the combustion gases 66 and the water 174. The heat exchanger 200 includes at least one combustion-gas passage 222 and, preferably, a plurality of combustion-gas passages 220. The combustion gases 66 flow through the combustion-gas passages 220 within the heat exchanger 200 and thus form part of the hot gas path 78 (FIG. 1). Within the heat exchanger 200, heat is exchanged between the combustion gases 66 and at least one other heat exchange fluid. The combustion gases 66 are thus a heat exchange fluid and the combustion-gas passage 222 may also be referred to herein as a first heat exchange fluid passage.

The heat exchanger 200 also includes at least one second heat exchange fluid passage (e.g., a water/steam passage 224) through which a second heat exchange fluid flows. In this example, the heat exchanger 200 is the boiler 102 and the second heat exchange fluid is the water 174. As noted above, the water 174 flows into the boiler 102 and through the second heat exchange fluid passage, which, in this embodiment, is referred to herein as a water/steam passage 224. As the water 174 flows through the water/steam passage 224, heat is transferred from the combustion gases 66 into the water 174. The water 174 absorbs the heat and changes phase into water vapor (i.e., steam 176). The steam 176 may also continue to flow through the second heat exchange fluid passage 224 absorbing additional heat from the combustion gases 66, superheating the steam 176.

The combustion-gas passage 222 and the water/steam passage 224 are separated from each other by a wall 212. As noted above, the boiler 102 shown in FIG. 3 is a plate heat exchanger and, thus, the combustion-gas passage 222 and the water/steam passage 224 are separated from each other by the plate 210, and the plate 210 includes the wall 212. The heat from the combustion gases 66 flows through the wall 212 and into the water 174 and/or steam 176. When other heat exchanger constructions are used, the wall 212 may thus be part of other components separating the combustion-gas passage 222 from the water/steam passage 224 and through which heat flows. For example, the heat exchanger 200 may be a tube and shell heat exchanger. The tube defines one of the combustion-gas passage 222 or the water/steam passage 224 on the interior of the tube. The wall 212 may thus be the wall of the tube and, in some embodiments, a combustion-gas-facing surface 214 defines the combustion-gas passage 222 within the interior of the tube.

One wall 212 at least partially defines each of the combustion-gas passage 222 and the water/steam passage 224. As noted above, when the wall 212 is part of a tube, the one wall 212 may define one of the combustion-gas passage 222 or the water/steam passage 224. When the wall 212 is part of another component such as the plate 210, one wall 212 may define the combustion-gas passage 222 or the water/steam passage 224 in conjunction with another wall 212, such as the wall 212 of another plate 210 or a wall 212 of an exterior shell 218 of the heat exchanger 200. The wall 212 thus includes a combustion-gas-facing surface 214. The combustion-gas-facing surface 214 is the surface facing the hot gas path 78 and the combustion-gas passage 222 through with the combustion gases 66 flow. As used herein, the term "facing surface" when used in conjunction with other modifiers is used to identify the position of one surface of a component, substrate, layer, and the like relative to other surfaces of the same component, substrate, layer, and the like. Such surfaces are not necessarily directly exposed to the fluid, for example, which they face. For example, as will be discussed below, the combustion-gas-facing surface 214 of the wall 212 is not directly exposed to the combustion gases 66 as one or more coating are formed thereon.

In other embodiments, the heat exchanger 200 may be the condenser 104 and heat from the combustion gases 66 is transferred from the combustion gases 66, through the wall, and into the second heat exchange fluid to condense water from the combustion gases and to generate the exhaust-water mixture 170 (FIG. 2). In such cases, the second heat exchange fluid may be, for example, the fuel 67, and the fuel 67 flows through the second heat exchange fluid passage.

The wall 212 may be formed from a metal. Metals have a relatively high thermal conductivity promoting heat transfer between the combustion-gas passage 222 and the water/steam passage 224. Metals suitable for use as the wall 212 in the heat exchanger 200 discussed herein include high temperature metals and metal alloys such as, for example, stainless steel, and corrosion-resistant alloys of nickel, chromium, or a combination of the two, including nickel-based superalloys and high-strength nickel-based alloys. For components of the steam system 100, such as the condenser 104, that are not directly exposed to the high temperatures of the combustion gases 66, lower temperature metals and metal alloys, such as for example, aluminum-based alloys, may be used. In some embodiments, cobalt-based alloys and titanium-based alloys may also be used. The wall 212 may thus be formed from a metal alloy chosen from the group consisting of iron-based alloys, nickel-based alloys, chromium-based alloys, aluminum-based alloys, cobalt-based alloys, and titanium-based alloys. Additionally, the substrate may be formed from nonmetallic materials including ceramic matric composites.

As used herein, the term "ceramic matrix composite" ("CMC") refers to a subgroup of composite materials and a subgroup of ceramics. The terms "CMC" and "CMC material" are used interchangeably herein. When the engine component (e.g., the higher pressure turbine module, nozzle, or blades thereof) comprises or includes "CMC" or "CMC material," the engine component may include one of, or combinations of one or more of the ceramic matrix composite materials described herein. Such engine component may also include non-ceramic matrix composite materials, such as a metal alloy (e.g., a CMC material for an airfoil and a separate disk with a dovetail slot made from a metal alloy). Reference to a "first" or a "second" or a "third" CMC material does not preclude the materials from including multiple CMC materials, different CMC materials, or the same CMC materials.

More specifically, CMC refers to a class of materials that includes a reinforcing material (e.g., reinforcing fibers) in a ceramic matrix. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting the preform with a liquid resin or polymer followed by a thermal processing step to fill the voids with silicon carbide. CMC material as used herein may be formed using any known methods or hereafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As noted above in FIG. 2, the turbine engine 10 includes a steam system 100 for extracting additional work from the combustion gases 66 that would otherwise be exhausted (see FIG. 1). The steam 178 may be injected into the hot gas path 78, such as into the combustor 26. Accordingly, the steam hot gas path components 120 are not only exposed to the high temperatures of the combustion gases 66, but also, to water within the combustion gases 66. Such water exposure is particularly acute when supercritical hydrogen or gaseous hydrogen is used as the fuel 67, as a combustion product is water. Accordingly, the steam hot gas path components 120 discussed herein, such as for example, the heat exchanger 200, include a hydrophobic coating 232 applied to the combustion-gas-facing surface 214 of the wall 212 to help to protect the steam hot gas path component 120, more specifically, the heat exchanger 200, and, even more specifically, the wall 212 from corrosion or ice-buildup on the combustion-gas-facing surface 214 of the steam hot gas path components 120, including during conditions when the turbine engine 10 is in a shut-down condition. In FIG. 2, the hydrophobic coating 232 is depicted as being applied directly to the combustion-gas-facing surface 214 of the wall 212, but hydrophobic coating 232 may be applied to intermediate layers. For example, the steam hot gas path components 120 may also have a thermal barrier coating applied to the outer surface, and, thus, the steam hot gas path components 120 may include both the hydrophobic coating 232 applied as an outer layer to the wall 212 and a thermal barrier coating applied as an intermediate layer between the hydrophobic coating 232 and the wall 212.

The "liquid wettability," or "wettability," of a solid surface may be determined by observing the nature of the interaction occurring between the solid surface and a drop of a given liquid disposed on the surface. A high degree of wetting results in a relatively low solid-liquid contact angle and large areas of liquid-solid contact. Conversely, a low degree of wetting results in a relatively high solid-liquid contact angle with the liquid forming droplets on the surface. The degrees of wettability discussed herein are discussed relative to the interaction of water to surfaces of the steam hot gas path components 120 and, more specifically, the exterior coatings, such as the hydrophobic coating 232 formed on the combustion-gas-facing surface 214. As described herein, these coatings are hydrophobic and, thus, the coatings preferably have relatively low water wettability with a contact angle at or above ninety (90) degrees. The hydrophobic coating 232 may also be a superhydrophobic coating having a contact angle greater than one hundred twenty (120) degrees. The hydrophobic coating 232 may be used to reduce wetting of the steam hot gas path component 120 from water vapor within the combustion gases 66 and to help to protect the steam hot gas path component 120, as discussed above.

As noted above, the hydrophobic coating 232 will be exposed to relatively high temperatures in the steam hot gas path components 120 discussed herein. During operation, some steam hot gas path components 120 may be exposed to these high operating temperatures (e.g., the boiler 102), but other steam hot gas path components 120 (e.g., the condenser 104 and water separator 106) may have their temperatures mitigated by the presence and heat absorption of the water vapor flowing through the system. Even these steam hot gas path components 120 that are cooler in operation may be exposed to the relative high temperatures discussed above because of soak-back heating. Immediately after shutdown, this soak-back heating may occur. With the turbine engine 10 shutdown these steam hot gas path components 120 may not have water flowing therethrough, and, thus, the water does not remove heat from these components, or these steam hot gas path components 120 may have the water flow reduced, resulting in less heat transfer. At the same time, may components of the turbine engine 10 are still hot (e.g., near operating temperature), and as the heat dissipates from these hot components, the temperature of the steam hot gas path components 120 may also increase beyond their normal operating temperatures. The materials used to form the hydrophobic coating 232 are, thus, preferably stable at these temperatures and do not thermally deteriorate. Many traditional hydrophobic materials are polymers, such as tetrafluoroethylene, silanes, waxes, polyethylene, and propylene, but such polymers are not suitable for these high temperature ranges. The hydrophobic coating 232 discussed herein may be formed from a ceramic material having sufficient hydrophobicity, such as a contact angle of eighty (80) degrees or greater and, more preferably, ninety (90) degrees or greater.

Suitable ceramic materials that may be used as the hydrophobic coating 232 include, for example, the ceramic coatings or "oxide materials" described in U.S. Pat. No. 7,977,267, the entirety of which is incorporated by reference herein. Both ytterbium (III) oxide and europium (III) oxide, which are $A_2O_3$-type oxides, have been found to promote dropwise condensation and to be intrinsically hydrophobic. Moreover, combinations (such as solid solutions) of these two oxides also were shown to have this same remarkable combination of properties. The hydrophobic coating 232, thus, may be formed of an oxide material containing one or more of ytterbia ($Yb_2O_3$) and europia ($Eu_2O_3$). The oxides may further contain other additives, such as oxides of gadolinium (Gd), samarium (Sm), dysprosium (Dy), or terbium (Tb). The oxide may further comprise lanthanum (La), praseodymium (Pr), or neodymium (Nd) in addition to the ytterbia and/or europia. As noted above, the hydrophobic coating 232 may be formed from a mixed ytterbium-europium oxide. The mixed ytterbium-europium oxide may have a formula of $(Yb_xEu_{1-x})_2O_3$, wherein x is in a range from about 0.01 to about 0.99. Such a material may comprise a B-type monoclinic oxide comprising ytterbia and europia, where up to about twenty-five (25) atom percent of the total cations present in the oxide are tetravalent cations. In some embodiments, this B-type oxide further comprises an additional material such as Sm, Dy, or Tb, and, in particular embodiments, this additional material is up to about fifty (50) mole percent of the oxide.

In one embodiment, the hydrophobic coating 232 may be formed from an oxide comprising from about sixty (60) mole percent to about ninety-five (95) mole percent gadolinia and at least about one (1) mole percent ytterbia or europia. In this embodiment, the oxide is B-type monoclinic, and less than about twenty-five (25) atomic percent of the total cations present in the oxide are tetravalent. In some embodiments, the oxide comprises up to about thirty (30) mole percent ytterbia, and, in certain embodiments, the oxide concurrently comprises at least about seventy (70) mole percent gadolinia. In other embodiments, the oxide comprises up to about twenty-five (25) mole percent europia, and may concurrently comprise at least about seventy-five (75) mole percent gadolinia. These embodiments may include "binary" oxides, in which the oxide consists essentially of gadolinia and either ytterbia or europia, but not both. In other embodiments, the oxide comprises both ytterbia and europia in addition to the gadolinia. In certain embodiments, the total amount of ytterbia plus europia present in the oxide is below about forty (40) mole percent, which provides an oxide that has shown particularly desirable wettability and condensation characteristics.

The hydrophobic coating 232 may be formed from certain compositions based on europia. In one embodiment, the hydrophobic coating 232 includes an oxide comprising at least about fifty (50) mole percent europia and further comprising samaria, terbia, or dysprosia. Less than about twenty-five (25) atomic percent of the total cations present in the oxide are tetravalent. In certain embodiments, the oxide is B-type monoclinic.

The hydrophobic coating 232 also may be formed from an oxide having a composition defined by the chemical formula $(A_xB_{1-x})_2O_3$. Here, A comprises Yb or Eu, and B comprises Gd, Sm, Dy, or Tb, and x is in a range from about 0.01 to about 0.99. In particular embodiments, less than about twenty-five (25) atomic percent of the total cations present in the oxide are tetravalent. Generally, these materials have exhibited surprisingly desirable wettability and condensation properties, but certain compositions are typically less desirable because poor behavior is observed or expected. For instance, when A is essentially Yb (i.e., the Eu content is very close to zero save for incidental impurity levels), only material having B consisting essentially of Gd is expected to show the desired properties. In some embodiments, x is up to about 0.3. Similarly, when A is essentially Eu, levels of Sm, Dy, and/or Tb as denoted by x in the above formula in a range from about 0.5 to about 0.99 may result in desirable properties. Certain combinations of cations in the this $(A_xB_{1-x})_2O_3$ material have shown or are expected to show particularly attractive wettability and condensation behavior and, thus, the hydrophobic coating 232 may be formed from the following oxides. In one example, A comprises Eu, such as when A comprises Eu and B comprises Gd. In a particular embodiment, A comprises Eu and B comprises Gd, and x is in a range from about 0.01 to about 0.4. Another particular range of interest in this system is when x is in a range from about 0.7 to about 0.9, when a contact angle of about one hundred (100) degrees was also observed. When A comprises both Eu and Yb, B, in some embodiments, comprises Gd. In particular embodiments of this type, x is in a range from about 0.01 to about 0.3. Alternatively, x may be in a range from about 0.5 to about 0.99.

Based on the forgoing, the hydrophobic coating 232 may be formed from an oxide generally comprising at least about twenty (20) mole percent of a first oxide that is ytterbia, europia, or a combination of these, and a second oxide that is an oxide of La, Pr, or Nd. In certain embodiments, the oxide material is defined by the chemical formula $((A)_xB_{1-x})_2O_3$, where A is Yb, Eu, or combinations thereof, and B is La, Pr, or Nd. In some embodiments, when B is La or Pr, x is in a range from greater than 0.5 to about 0.99. In other embodiments, when B is Nd, x is in a range from about 0.2 to about 0.99. In addition, any of the oxide compositions discussed above may be present in the hydrophobic coating 232 at a level of at least about fifty percent (50%) by volume, and, more preferably, the hydrophobic coating 232 may consists essentially of the oxide.

In addition to the materials used to form the hydrophobic coating 232, the desired hydrophobicity may be achieved by surface texturing or in conjunction with the application method of the hydrophobic coating 232.

The wall 212 may also include another surface facing the second heat exchange fluid (a second-heat-exchange-fluid-facing surface). The second heat exchange fluid, in this example, is the water 174 (and steam 176), and, thus, the surface facing the second heat exchange fluid is referred to herein as a water-facing surface 216. For reasons similar to those discussed above, a hydrophobic coating 234 may also be applied to the water-facing surface 216. The hydrophobic coating 234 may be the same as or similar to the hydrophobic coating 232 applied to the combustion-gas-facing surface 214 and, thus, the discussion of the hydrophobic coating 232 above also applies to the hydrophobic coating 234 formed on the water-facing surface 216.

Within the heat exchanger 200, heat is transferred from the first heat-transfer fluid to the second heat exchange fluid through the wall 212. The combustion-gas-facing surface 214 and the water-facing surface 216 are thus heat transfer surfaces, and preferably, any coating on these surfaces minimizes the impact to the flow of heat therethrough. The preferred hydrophobic coatings 232, 234 discussed herein are oxides, which may have a relatively high thermal resistance (low thermal conductivity). Nevertheless, the inventors have found that applying these hydrophobic coatings 232, 234, as discussed herein, is surprisingly beneficial despite the thermal performance impact.

Figure 3B:
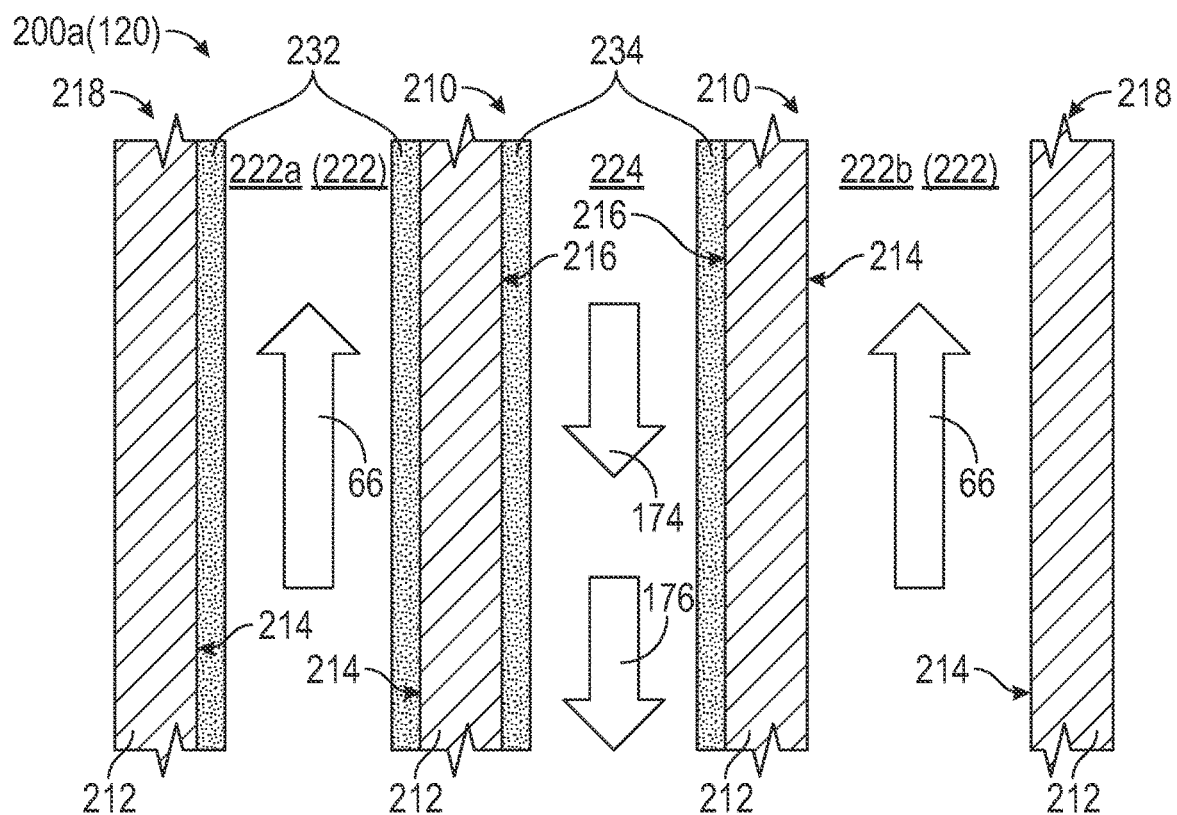
Figure 3C:
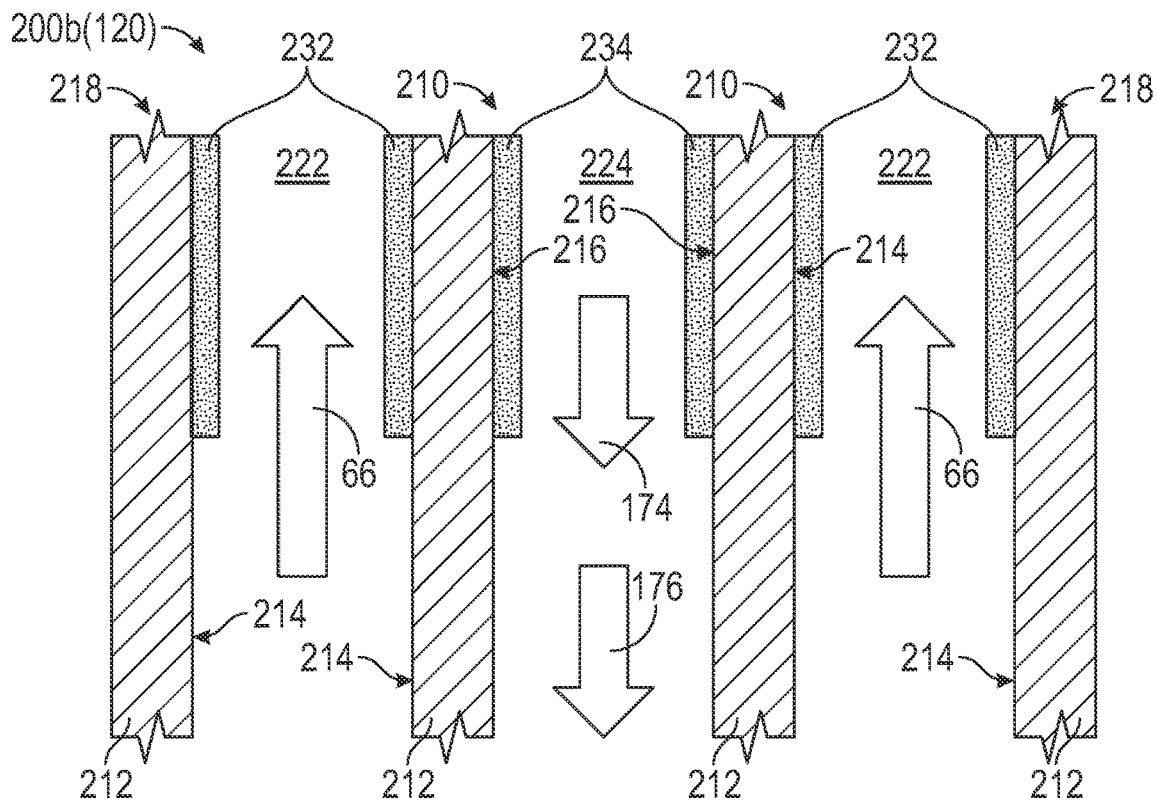

In the embodiment depicted in FIG. 3A, the hydrophobic coating 232 and the hydrophobic coating 234 are shown as coating the entire length of the combustion-gas-facing surface 214 and the water-facing surface 216, respectively, of the wall 212. Other arrangements, however, may be used. FIGS. 3B and 3C depict, some of these other arrangements of the hydrophobic coatings 232 and 234. The heat exchanger 200a shown in FIG. 3B and the heat exchanger 200b shown in FIG. 3C are each similar to the heat exchanger 200 discussed above with reference to FIG. 3A, and the same reference numerals will be used for components and features of the heat exchanger 200a shown in FIG. 3B and the heat exchanger 200b shown in FIG. 3C that are the same as or similar to the components and features of the heat exchanger 200 discussed above. The description of the components and features of the heat exchanger 200 discussed above also applies to the heat exchanger 200a shown in FIG. 3B and the heat exchanger 200b shown in FIG. 3C, and a detailed description of these components and features is omitted here.

FIG. 3B is a schematic, cross-sectional view of another heat exchanger 200a that may be used in the steam system 100. As noted above, the heat exchanger 200a may include a plurality of combustion-gas passages 222. In this embodiment, only some of the walls 212 of the plurality of combustion-gas passages (referred to herein as hydrophobic-coated combustion-gas passages 222a) include the hydrophobic coating 232 on the combustion-gas-facing surface 214, and the combustion-gas-facing surfaces 214 in the remaining combustion-gas passages (referred to herein as uncoated combustion-gas passages 222b) are free from the hydrophobic coating 232. Thus, the heat exchanger 202 may include a plurality of hydrophobic-coated combustion-gas passages 222 and a plurality of uncoated combustion-gas passages 222a. In some embodiments, at least twenty percent (20%) of the plurality combustion-gas passages 222 are hydrophobic-coated combustion-gas passages 222a. The hydrophobic-coated combustion-gas passages 222a may be eighty percent (80%) or less of the plurality combustion-gas passages 222, such as sixty percent (60%) or less, fifty percent (50%) or less, forty percent (40%) or less, or thirty percent (30%) or less. In such cases, the remainder of the plurality combustion-gas passages 222 may be uncoated combustion-gas passages 222b.

Under conditions where the plurality of combustion-gas passage 222 is susceptible to icing, the uncoated combustion-gas passages 222a may have ice form therein, but the hydrophobic-coated combustion-gas passages 222a will continue to allow the combustion gases 66 to flow therethrough. With continued operation, the temperature may subsequently increase in the uncoated combustion-gas passages 222b, melting the ice that has formed in the uncoated combustion-gas passages 222*b*. With only a portion of the combustion-gas passages 222 having the hydrophobic coating 232 formed on the combustion-gas-facing surface 214, only a portion of the combustion-gas passages 222 have a detrimental impact on the heat transfer because of the hydrophobic coating 232, the uncoated combustion-gas passages 222*b* can thus provide better heat transfer under non-icing conditions but maintain sufficient performance under icing conditions.

As noted above, the heat exchanger 200*a* may include a plurality of second heat exchange fluid passages (e.g., water/steam passage 224). Like the plurality of combustion-gas passages 222, some of the plurality of second heat exchange fluid passages may include the hydrophobic coating 234 and the remaining second heat exchange fluid passages are free form the hydrophobic coating 234. The discussion of the plurality of combustion-gas passages 222, thus applies to the plurality of second heat exchange fluid passages, as well.

FIG. 3C is a schematic, cross-sectional view of another heat exchanger 200*b* that may be used in the steam system 100. Ice may tend to form in the colder regions of the heat exchanger 200*b*. In this embodiment, only a portion of each of the combustion-gas passage 222 and the second heat exchange fluid passage (e.g., water/steam passage 224) have the hydrophobic coating 232 and 234 formed thereon. The hydrophobic coating 232 may be formed on a downstream portion of the combustion-gas-facing surfaces 214 of the combustion-gas passage 222, and the hydrophobic coating 234 may be formed on an upstream portion of the water-facing surface 216 of the second heat exchange fluid passage (e.g., water/steam passage 224). In some embodiments, at least twenty percent (20%) of the combustion-gas-facing surface 214 is coated with the hydrophobic coating 232 and at least twenty percent (20%) of the water-facing surface 216 is coated with the hydrophobic coating 234. The hydrophobic coating 232 may be formed on eighty percent (80%) or less of the combustion-gas-facing surface 214, such as sixty percent (60%) or less, fifty percent (50%) or less, forty percent (40%) or less, or thirty percent (30%) or less. Similarly, the hydrophobic coating 234 may be formed on eighty percent (80%) or less of the water-facing surface 216, such as sixty percent (60%) or less, fifty percent (50%) or less, forty percent (40%) or less, or thirty percent (30%) or less.

Figure 4:
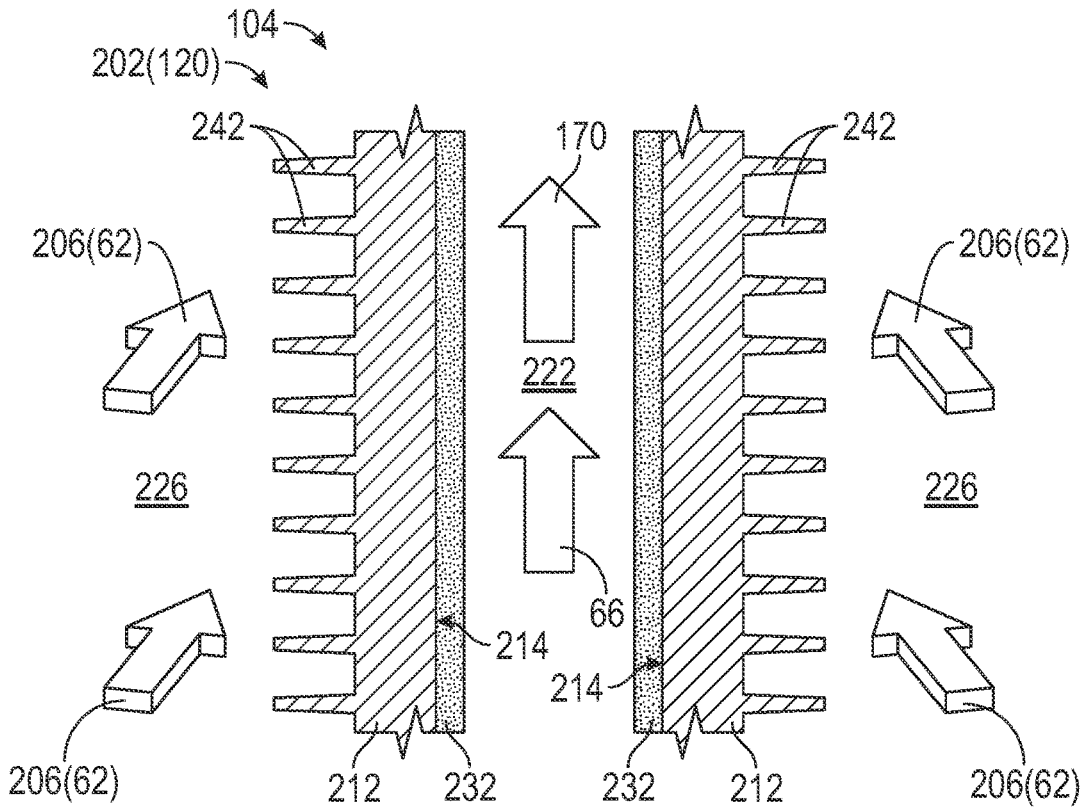
FIG. 4 is a schematic, cross-sectional view of another heat exchanger that may be used in the steam system shown in FIG. 2.

FIG. 4 is a schematic, cross-sectional view of another heat exchanger 202 that may be used in the steam system 100. More specifically, the heat exchanger 202 illustrated in FIG. 4 may be the condenser 104. The heat exchanger 202 shown in FIG. 4 is similar to the heat exchanger 200 discussed above with reference to FIG. 3A. The same reference numerals will be used for components and features of the heat exchanger 202 of this embodiment that are the same as or similar to the components and features of the heat exchanger 200 discussed above. The description of the components and features of the heat exchanger 200 discussed above also applies to the heat exchanger 202 of this embodiment, and a detailed description of these components and features is omitted here.

As the combustion gases 66 flow through condenser 104, heat is transferred from the combustion gases 66 to a condensing fluid (i.e., a second heat exchange fluid) flowing through the condenser 104. When the condensing fluid is a liquid, such as fuel 67, for example, the condenser 104 may have a construction similar to the heat exchanger 200 discussed above with reference to FIG. 3A, but when the condensing fluid is a gas, such as a cooling air 206 and, more specifically, in this embodiment, bypass air 62, the condenser 104 may have the construction and arrangement of the heat exchanger 202 shown in FIG. 4.

The cooling air 206 (bypass air 62) flows through a cooling air passage 226 of the heat exchanger 202 (condenser 104). Similar to the discussion above, the bypass airflow passage 226 is separated from the combustion-gas passage 222 by the wall 212. As the bypass air 62 flows through the bypass airflow passage 226, heat is transferred from the combustion gases 66 through the wall 212 and into the cooling air 206 (bypass air 62), cooling the combustion gases 66 and condensing water in the combustion gases 66 to form the exhaust-water mixture 170. To promote heat transfer through the wall 212 and to the cooling air 206 (bypass air 62), the wall 212 may have fins 242 formed on the surface of the wall 212 facing the cooling air passage 226.

Various features of the steam hot gas path components 120 have been described with reference to heat exchangers 200, 202 that may be used within the steam system 100. However, the description of the hydrophobic coating 232 may also apply to other combustion-gas-facing surfaces 214 in other steam hot gas path components 120 of the steam system 100, such as the core exhaust nozzles 32 and the water separator 106.

Figure 5:
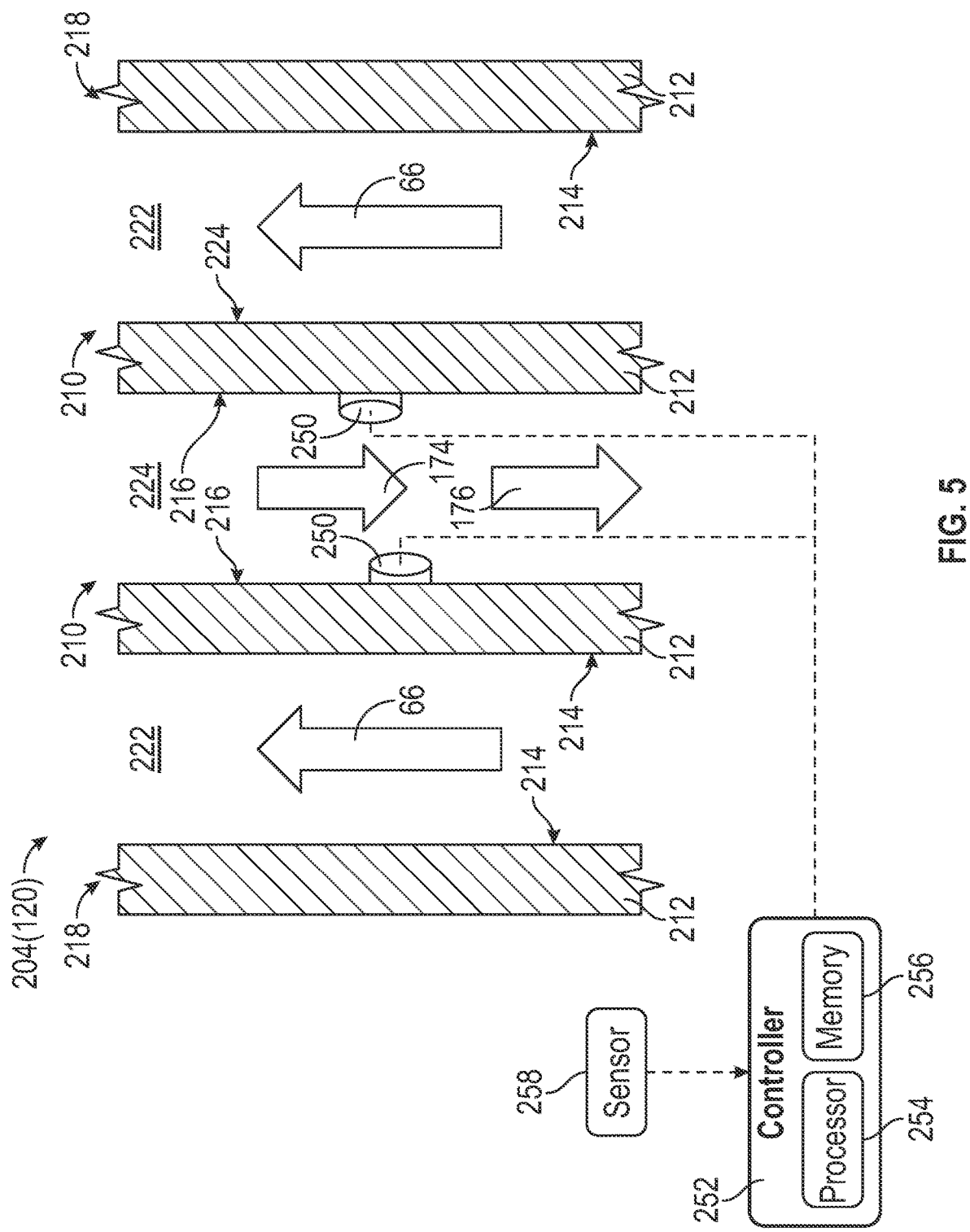
FIG. 5 is a schematic, cross-sectional view of another heat exchanger that may be used in the steam system shown in FIG. 2.

FIG. 5 is a schematic, cross-sectional view of another heat exchanger 204 that may be used in the steam system 100. The heat exchanger 204 shown in FIG. 5 is similar to the heat exchanger 200 discussed above with reference to FIG. 3A. The same reference numerals will be used for components and features of the heat exchanger 204 of this embodiment that are the same as or similar to the components and features of the heat exchanger 200 discussed above. The description of the components and features of the heat exchanger 200 discussed above also applies to the heat exchanger 204 of this embodiment, and a detailed description of these components and features is omitted here.

In the embodiments discussed above, the heat exchangers 200, 200*a*, 200*b*, included a hydrophobic coating 232 and 234 to prevent ice from forming on the surfaces of the walls 212. Other methods, however, may be used to prevent ice from forming thereon. One such method may be to use induced vibrations or discrete mechanical pulses in the wall 212 to prevent ice buildup on the surfaces of the wall 212. Accordingly, at least one pulser 250 may be connected to the wall 212 to induce the discrete mechanical pulse/vibrations in the wall 212, such as by being attached or otherwise in contact with the wall 212. The discrete pulses may be induced by a mechanical movement mechanism, such as an actuator or motor and the pulser 250 includes the mechanical movement mechanism. The pulser 250 may also be an ultrasonic frequency generator (transducer) or a piezoelectric transducer.

As the discrete pulses may cause cracking and other damage in the hydrophobic coatings 232 and 234 discussed herein, particularly when the hydrophobic coating 232 and 234 is the oxides discussed herein. Such discrete pulses may cause spallation. Accordingly, in this embodiment, the wall 212 may be free from the hydrophobic coating 232 and 234.

The pulser 250 may be communicatively and operatively coupled to a controller, such as an engine controller 252 for the turbine engine. The engine controller 252 is configured to operate various aspects of the turbine engine 10, including, in the embodiments discussed herein, the pulser 250. The engine controller 252 may be a Full Authority Digital Engine Control (FADEC). In this embodiment, the engine controller 252 is a computing device having one or more processors 254 and one or more memories 256. The processor 254 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 256 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 256 can store information accessible by the processor 254, including computer-readable instructions that can be executed by the processor 254. The instructions can be any set of instructions or a sequence of instructions that, when executed by the processor 254, causes the processor 254 and the engine controller 252 to perform operations. In some embodiments, the instructions can be executed by the processor 254 to cause the processor 254 to complete any of the operations and functions for which the engine controller 252 is configured, as will be described further below. The instructions can be software written in any suitable programming language, or can be implemented in hardware. Additionally, and/or alternatively, the instructions can be executed in logically and/or virtually separate threads on the processor 254. The memory 256 can further store data that can be accessed by the processor 254.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The engine controller 252 may be communicatively coupled to one or more sensors 258 to receive an input from the one or more sensors 258, and, based on the input received from the one or more sensors 258, the engine controller 252 is configured to determine if icing conditions are present. If icing conditions are present, the engine controller 252 operates the pulser 250 to produce the discrete pulses and prevent ice formation and buildup. The sensors 258 may include, for example, temperature sensors, humidity sensors, pressure sensors, and other sensors used to determine altitude. Additionally, or alternatively, the engine controller 252 may receive an input, such as a cockpit command, and in response to that command input operate the pulser 250 to generate the discrete pulses.

The turbine engine 10 discussed herein includes a steam system 100 that is used to produce steam 176, 178. In addition to producing extra work from the combustion gases 66 that would otherwise be exhausted, the steam 176, 178 may be used as a cooling fluid, such as with HPT cooling air 122 and LPT cooling air 256. The steam hot gas path components 120 discussed herein may thus be positioned within fluid passages containing the combustion gases 66 with water vapor. In the embodiments discussed herein, a hydrophobic coating 232, 234 is applied to surfaces of the steam hot gas path components 120, and, more specifically, heat exchangers 200, 202 of the steam system. Further aspects of the present disclosure are provided by the subject matter of the following clauses.

A turbine engine for an aircraft. The turbine engine includes a combustor, a core shaft, a turbine, and a steam system. The combustor is located in a core air flow path to receive compressed air and fluidly coupled to both a fuel source and a steam source to receive fuel and steam, respectively. The fuel and steam are injected into the combustor to mix with the compressed air to generate a fuel and air mixture. The fuel and air mixture is combusted in the combustor to generate combustion gases. The turbine is located downstream of the combustor to receive the combustion gases and to rotate the turbine. The turbine is coupled to the core shaft to rotate the core shaft when the turbine rotates. The steam system is fluidly coupled to the combustor as the steam source to provide steam to the combustor. The steam system includes a hot gas path and a steam hot gas path component. The hot gas path is fluidly coupled to the combustor to receive the combustion gases and to route the combustion gases through the steam system. The steam hot gas path component is fluidly connected to the hot gas path. The steam hot gas path component includes a wall having a combustion-gas-facing surface facing the hot gas path.

The turbine engine of the preceding clause, wherein a hydrophobic coating is formed on the combustion-gas-facing surface, reducing wetting of the steam hot gas path component from water vapor within the combustion gases.

The turbine engine of the preceding clause, wherein the hydrophobic coating is formed from an oxide.

The turbine engine of the preceding clause, wherein the oxide has a composition defined by the chemical formula $(A_xB_{1-x})_2O_3$, wherein A comprises Yb or Eu, and B comprises Gd, Sm, Dy, or Tb, and x is in a range from about 0.01 to about 0.99, subject to the following: provided that, (i) when A consists essentially of Yb, B consists essentially of Gd and (ii) when A consists essentially of Eu and B comprises Sm, Dy, or Tb, x is in a range from about 0.5 to about 0.99.

The turbine engine of the preceding clause, wherein the oxide has a composition defined by the chemical formula $(A_xB_{1-x})_2O_3$, wherein A comprises Yb and Eu, and B comprises Gd, Sm, Dy, or Tb, and x is in a range from about 0.01 to about 0.99.

The turbine engine of any preceding clause, wherein A comprises Eu.

The turbine engine of any preceding clause, wherein A comprises Eu and Yb.

The turbine engine of any preceding clause, wherein B comprises Gd.

The turbine engine of any preceding clause, wherein B consists essentially of Gd.

The turbine engine of any preceding clause, wherein x is in a range from about 0.01 to about 0.3.

The turbine engine of any preceding clause, wherein x is in a range from about 0.01 to about 0.4.

The turbine engine of any preceding clause, wherein x is in a range from about 0.7 to about 0.9.

The turbine engine of any preceding clause, wherein x is in a range from about 0.01 to about 0.3.

The turbine engine of any preceding clause, wherein x is in a range from about 0.5 to about 0.99.

The turbine engine of any preceding clause, wherein the oxide comprises from about sixty (60) mole percent to about ninety-nine (99) mole percent gadolinia and at least about one (1) mole percent ytterbia.

The turbine engine of any preceding clause, wherein the oxide comprises up to about thirty (30) mole percent ytterbia.

The turbine engine of any preceding clause, wherein the oxide comprises at least about seventy (70) mole percent gadolinia.

The turbine engine of any preceding clause, wherein the oxide further comprises europia.

The turbine engine of any preceding clause, wherein the oxide further comprises samaria, dysprosia, or terbia.

The turbine engine of any preceding clause, wherein the oxide comprises x mole percent of ytterbia and 100−x mole percent of gadolinia, wherein x is up to about thirty (30) mole percent.

The turbine engine of any preceding clause, wherein the oxide comprises at least about fifty (50) mole percent europia, and comprises at least one of samaria, terbia, or dysprosia.

The turbine engine of any preceding clause, wherein the oxide is B-type monoclinic.

The turbine engine of any preceding clause, wherein the oxide has up to about twenty-five (25) atomic percent of its total cation content as tetravalent cations.

The turbine engine of any preceding clause, wherein the oxide is present in the hydrophobic coating at a level of at least about fifty percent (50%) by volume.

The turbine engine of any preceding clause, wherein the hydrophobic coating consists essentially of the oxide.

The turbine engine of any preceding clause, wherein the steam system includes a boiler located downstream of the combustor. The boiler receives water and is fluidly connected to the combustor to receive the combustion gases and to boil the water to generate steam.

The turbine engine of any preceding clause, wherein the steam system includes a steam turbine fluidly coupled to the boiler to receive the steam from the boiler and to rotate the steam turbine. The steam turbine is coupled to the core shaft to rotate the core shaft when the steam turbine rotates.

The turbine engine of any preceding clause, wherein the steam system includes a condenser located downstream of the combustor to condense water from the combustion gases and to generate an exhaust-water mixture.

The turbine engine of any preceding clause, wherein the condenser is located downstream of the boiler to receive the combustion gases from the boiler.

The turbine engine of any preceding clause, wherein the steam system includes a water separator located downstream of the condenser. The water separator separates the water from the exhaust-water mixture.

The turbine engine of the preceding clause, wherein the water separator is a cyclonic separator.

The turbine engine of any preceding clause, wherein the water separator is the steam hot gas path component.

The turbine engine of any preceding clause, wherein the water separator is fluidly connected to the boiler to provide the water to the boiler.

The turbine engine of any preceding clause, further comprising a water pump in fluid communication with the water separator and with the boiler to induce the flow of water from the water separator into the boiler.

The turbine engine of any preceding clause, wherein the steam hot gas path component is a heat exchanger.

The turbine engine of the preceding clause, wherein the heat exchanger includes a wall at least partially defining a combustion-gas passage, the combustion-gas passage being a part of the hot gas path and the hydrophobic coating being formed on the wall.

The turbine engine of the preceding clause, wherein the hydrophobic coating is formed on a portion of the wall.

The turbine engine of the preceding clause, wherein the hydrophobic coating is formed on a downstream portion of the wall.

The turbine engine of the preceding clause, wherein the hydrophobic coating is formed on a combustion-gas-facing surface and at least twenty percent (20%) of the combustion-gas-facing surface is coated with the hydrophobic coating.

The turbine engine of the preceding clause, wherein the hydrophobic coating is formed on eighty percent (80%) or less of the combustion-gas-facing surface.

The turbine engine of the preceding clause, wherein the hydrophobic coating is formed on sixty percent (60%) or less of the combustion-gas-facing surface.

The turbine engine of the preceding clause, wherein the hydrophobic coating is formed on fifty percent (50%) or less of the combustion-gas-facing surface.

The turbine engine of the preceding clause, wherein the hydrophobic coating is formed on forty percent (40%) or less of the combustion-gas-facing surface.

The turbine engine of the preceding clause, wherein the hydrophobic coating is formed on thirty percent (30%) or less of the combustion-gas-facing surface.

The turbine engine of any preceding clause, wherein the heat exchanger includes a plurality of combustion-gas passages, each combustion gas passage being defined, at least in part, by a wall, a portion of the plurality of combustion-gas passages being hydrophobic-coated combustion-gas passages, the hydrophobic coating being formed on the walls defining the hydrophobic-coated combustion-gas passages.

The turbine engine of the preceding clause, wherein at least twenty percent (20%) of the plurality combustion-gas passages are hydrophobic-coated combustion-gas passages.

The turbine engine of the preceding clause, wherein the remainder of the plurality combustion-gas passages are uncoated combustion-gas passages.

The turbine engine of the preceding clause, wherein the uncoated combustion-gas passages are free from the hydrophobic coating.

The turbine engine of any preceding clause, wherein the hydrophobic-coated combustion-gas passages are eighty percent (80%) or less of the plurality combustion-gas passages.

The turbine engine of any preceding clause, wherein the hydrophobic-coated combustion-gas passages are eighty percent (80%) or less of the plurality combustion-gas passages.

The turbine engine of any preceding clause, wherein the hydrophobic-coated combustion-gas passages are sixty percent (60%) or less of the plurality combustion-gas passages.

The turbine engine of any preceding clause, wherein the hydrophobic-coated combustion-gas passages are fifty percent (50%) or less of the plurality combustion-gas passages.

The turbine engine of any preceding clause, wherein the hydrophobic-coated combustion-gas passages are forty percent (40%) or less of the plurality combustion-gas passages.

The turbine engine of any preceding clause, wherein the hydrophobic-coated combustion-gas passages are thirty percent (30%) or less of the plurality combustion-gas passages.

The turbine engine of any preceding clause, wherein the wall separates the combustion-gas passage from a second heat exchange fluid passage for a second heat exchange fluid.

The turbine engine of any preceding clause, wherein the wall includes a second-heat-exchange-fluid-facing surface facing the second heat exchange fluid passage and another hydrophobic coating formed on the second-heat-exchange-fluid-facing surface.

The turbine engine of the preceding clause, wherein the hydrophobic coating is formed on a portion of the second-heat-exchange-fluid-facing surface.

The turbine engine of the preceding clause, wherein the hydrophobic coating is formed on an upstream portion of the second-heat-exchange-fluid-facing surface.

The turbine engine of the preceding clause, wherein the hydrophobic coating is formed on at least twenty percent (20%) of the second-heat-exchange-fluid-facing surface.

The turbine engine of the preceding clause, wherein the hydrophobic coating is formed on eighty percent (80%) or less of the second-heat-exchange-fluid-facing surface.

The turbine engine of the preceding clause, wherein the hydrophobic coating is formed on sixty percent (60%) or less of the second-heat-exchange-fluid-facing surface.

The turbine engine of the preceding clause, wherein the hydrophobic coating is formed on fifty percent (50%) or less of the second-heat-exchange-fluid-facing surface.

The turbine engine of the preceding clause, wherein the hydrophobic coating is formed on forty percent (40%) or less of the second-heat-exchange-fluid-facing surface.

The turbine engine of the preceding clause, wherein the hydrophobic coating is formed on thirty percent (30%) or less of the second-heat-exchange-fluid-facing surface.

The turbine engine of any preceding clause, wherein the heat exchanger includes a plurality of second heat exchange fluid passages, each second heat exchange fluid passage being defined, at least in part, by a wall, a portion of the plurality of second heat exchange fluid passages being hydrophobic-coated second heat exchange fluid passages, the hydrophobic coating being formed on the walls defining the second heat exchange fluid passages.

The turbine engine of the preceding clause, wherein at least twenty percent (20%) of the plurality second heat exchange fluid passages are hydrophobic-coated second heat exchange fluid passages.

The turbine engine of the preceding clause, wherein the remainder of the plurality second heat exchange fluid passages are uncoated second heat exchange fluid passages.

The turbine engine of the preceding clause, wherein the uncoated second heat exchange fluid passages are free from the hydrophobic coating.

The turbine engine of any preceding clause, wherein the hydrophobic-coated second heat exchange fluid passages are eighty percent (80%) or less of the plurality second heat exchange fluid passages.

The turbine engine of any preceding clause, wherein the hydrophobic-coated second heat exchange fluid passages are eighty percent (80%) or less of the plurality second heat exchange fluid passages.

The turbine engine of any preceding clause, wherein the hydrophobic-coated second heat exchange fluid passages are sixty percent (60%) or less of the plurality second heat exchange fluid passages.

The turbine engine of any preceding clause, wherein the hydrophobic-coated second heat exchange fluid passages are fifty percent (50%) or less of the plurality second heat exchange fluid passages.

The turbine engine of any preceding clause, wherein the hydrophobic-coated second heat exchange fluid passages are forty percent (40%) or less of the plurality second heat exchange fluid passages.

The turbine engine of any preceding clause, further comprising at least one pulser may be connected to the wall to induce a discrete pulse in the wall.

The turbine engine of any preceding clause, wherein the wall is free from a hydrophobic coating.

The turbine engine of any preceding clause, wherein the pulser is attached to the wall.

The turbine engine of any preceding clause, wherein the pulser includes a mechanical movement mechanism to generate the discrete pulse.

The turbine engine of any preceding clause, wherein the pulser is an ultrasonic transducer.

The turbine engine of any preceding clause, wherein the pulser is a piezoelectric transducer.

The turbine engine of any preceding clause, further comprising a controller communicatively and operatively coupled to the pulser to operate the pulser to produce the discrete pulses.

The turbine engine of the preceding clause, wherein the controller is communicatively coupled to one or more sensors to receive an input from the one or more sensors.

The turbine engine of the preceding clause, wherein the controller is configured to determine if icing conditions are present based on the input received from the one or more sensors, and to operate the pulser when icing conditions are present.

The turbine engine of any preceding clause, wherein the heat exchanger is a plate heat exchanger having at least one plate including the wall.

The turbine engine of the preceding clause, wherein a combustion-gas-facing surface of the wall defines, at least in part, the combustion-gas passage.

The turbine engine of any preceding clause, wherein the heat exchanger is a tube heat exchanger having at least one tube including the wall.

The turbine engine of the preceding clause, wherein a combustion-gas-facing surface defines the combustion-gas passage within an interior of the tube.

The turbine engine of any preceding clause, wherein the steam system includes a boiler located downstream of the combustor, the boiler receiving water and being fluidly connected to the combustor to receive the combustion gases and to boil the water to generate steam, wherein the boiler is the heat exchanger and the second heat exchange fluid passage is a water/steam passage through which the water flows.

The turbine engine of any preceding clause, wherein the steam system includes a condenser located downstream of the combustor to condense water from the combustion gases and to generate an exhaust-water mixture, the condenser being the heat exchanger.

The turbine engine of any preceding clause, wherein the wall separates the combustion-gas passage from a cooling air passage for a cooling air.

The turbine engine of any preceding clause, wherein the wall includes fins formed on a surface of the wall facing the cooling air passage.

The turbine engine of any preceding clause, wherein the steam system includes a condenser located downstream of the combustor to condense water from the combustion gases and to generate an exhaust-water mixture, the condenser being the heat exchanger.

The turbine engine of any preceding clause, further comprising a fan including a plurality of blades, a first portion of air flowing into the fan flows through a bypass airflow passage as bypass air and a second portion of the air flowing into the fan flows through the core air flow path as core air, wherein the condenser is positioned in the bypass airflow passage and the bypass air is the cooling air.

The turbine engine of any preceding clause, wherein the core shaft is a low-pressure shaft and the turbine is a low-pressure turbine.

The turbine engine of any preceding clause, further comprising a low-pressure compressor connected to the low-pressure shaft to be driven by the low-pressure turbine and the steam turbine.

The turbine engine of any preceding clause, further comprising a fan including a plurality of blades and a fan shaft, the fan shaft being coupled to the low-pressure shaft to be driven by the low-pressure shaft.

The turbine engine of any preceding clause, further comprising a bypass airflow passage and a condenser. A first portion of air flowing into the fan flowing through the bypass airflow passage as bypass air and a second portion of the air flowing into the fan flowing through the core air flow path as core air. The condenser is positioned downstream of the boiler and in the bypass airflow passage for bypass air to cool the combustion gases and to condense the water from the combustion gases.

The turbine engine of any preceding clause, further comprising a low-pressure compressor positioned in the core air flow path upstream of the compressor, the low-pressure compressor being driven by the low-pressure shaft to compress the core air flowing through the core air flow path and to generate the compressed air.

The turbine engine of any preceding clause, further comprising a high-pressure shaft, a high-pressure turbine, and a high-pressure compressor. The high-pressure turbine is positioned downstream of the combustor to receive the combustion gases and to rotate the high-pressure turbine. The high-pressure turbine is positioned upstream of the combustor to receive the combustion gases and to rotate the high-pressure turbine. The high-pressure turbine is coupled to the high-pressure shaft to rotate the high-pressure shaft when the high-pressure turbine rotates. The high-pressure compressor is positioned in the core air flow path upstream of the high-pressure compressor and downstream of the low-pressure compressor. The high-pressure compressor is driven by the high-pressure shaft to compress the core air flowing through the core air flow path and to generate the compressed air.

The turbine engine of any preceding clause, further comprising a core turbine engine. The core turbine engine including the combustor, the turbine, and the core shaft. The combustor and the turbine define a core air flow path. The steam system extracts water from the combustion gases, vaporizes the water to generate steam, and injects the steam into the core air flow path to add mass flow to the core air.

The turbine engine of the preceding clause, further comprising a fan and a nacelle, and a steam system. The fan including a plurality of fan blades that rotates to generate a volume of air. The fan is coupled to the core shaft such that rotation of the turbine causes the fan to rotate. The nacelle circumferentially surrounds the fan. The nacelle defines a bypass airflow passage between the nacelle and the core turbine engine. The volume of air from the fan is split and flows into the bypass airflow passage as bypass air and flows into the core air flow path as the core air.

The turbine engine of the preceding clause, wherein a bypass ratio of the bypass air to the core air is greater than 18:1.

The turbine engine of any preceding clause, wherein the bypass ratio is in a range of 18:1 to 100:1.

The turbine engine of any preceding clause, wherein the bypass ratio is in a range of 25:1 to 85:1.

The turbine engine of any preceding clause, wherein the bypass ratio is in a range of 28:1 to 70:1.

The turbine engine of any preceding clause, wherein the core turbine engine further includes a compressor that compresses the core air to generate the compressed air. The compressor is coupled to the core shaft and defines a portion of the core air flow path.

The turbine engine of the preceding clause, wherein the compressor includes a high-pressure compressor and includes a compression ratio greater than 20:1.

The turbine engine of the preceding clause, wherein the plurality of stages of the compressor includes ten to twelve stages.

The turbine engine of any preceding clause, wherein the turbine includes a high-pressure turbine (HPT) and includes only one stage of HPT rotor blades and HPT stator vanes.

The turbine engine of any preceding clause, further comprising a low-pressure turbine.

The turbine engine of the preceding clause, wherein the low-pressure turbine has a low-pressure shaft coupled to the fan The turbine engine of any preceding clause, further comprising a low-pressure compressor coupled to the low-pressure shaft to be driven by the low-pressure turbine and the steam turbine.

The turbine engine of any preceding clause, the low-pressure turbine having a pressure expansion ratio in a range of 4.5:1 to 28:1.

The turbine engine of any preceding clause, the high-pressure turbine having a pressure expansion ratio in a range of 1.5:1 to 4:1.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine for an aircraft, the turbine engine comprising:
   a combustor located in a core air flow path to receive compressed air and fluidly coupled to both a fuel source and a steam source to receive fuel and steam, respectively, the fuel and steam being injected into the combustor to mix with the compressed air to generate a fuel and air mixture, the fuel and air mixture being combusted in the combustor to generate combustion gases;
   a core shaft;
   a turbine located downstream of the combustor to receive the combustion gases and to rotate the turbine, the turbine being coupled to the core shaft to rotate the core shaft when the turbine rotates; and
   a steam system fluidly coupled to the combustor as the steam source to provide steam to the combustor, the steam system including:
      a hot gas path fluidly coupled to the combustor to receive the combustion gases and to route the combustion gases through the steam system; and
      a steam hot gas path component fluidly connected to the hot gas path, the steam hot gas path component including a plurality of combustion-gas passages, each combustion-gas passage of the plurality of combustion-gas passages being defined by a wall having a combustion-gas-facing surface facing the hot gas path, a portion of the plurality of combustion-gas passages being hydrophobic-coated combustion-gas passages with a hydrophobic coating formed on the combustion-gas-facing surface, and the remaining combustion-gas passages of the plurality of combustion-gas passages being uncoated combustion-gas passages that are free from the hydrophobic coating.

2. The turbine engine of claim 1, wherein the hydrophobic coating is formed from an oxide, the oxide has up to about 25 atomic percent of its total cation content as tetravalent cations, the oxide having a composition defined by the chemical formula $(A_xB_{1-x})_2O_3$, wherein A comprises ytterbium or europium, and B comprises gadolinium, samarium, dysprosium, or terbium, and wherein x is in a range from about 0.01 to about 0.99, subject to the following: provided that, (i) when A consists essentially of ytterbium, B consists essentially of gadolinium and (ii), when A consists essentially of europium and B comprises samarium, dysprosium, or terbium, x is in a range from about 0.5 to about 0.99.

3. The turbine engine of claim 1, wherein the hydrophobic coating is formed from an oxide, the oxide comprises from about 60 mole percent to about 99 mole percent gadolinia and at least about 1 mole percent ytterbia, wherein the oxide is B-type monoclinic and the oxide has up to about 25 atomic percent of its total cation content as tetravalent cations.

4. The turbine engine of claim 1, wherein the hydrophobic coating is formed from an oxide that comprises at least about 50 mole percent europia, and comprises at least one of samaria, terbia, or dysprosia, wherein the oxide has up to about 25 atomic percent of its total cation content as tetravalent cations.

5. The turbine engine of claim 1, wherein the steam system further includes:
a boiler located downstream of the combustor, the boiler receiving water and being fluidly connected to the combustor to receive the combustion gases and to boil the water to generate steam; and
a steam turbine fluidly coupled to the boiler to receive the steam from the boiler and to rotate the steam turbine, the steam turbine being coupled to the core shaft to rotate the core shaft when the steam turbine rotates.

6. The turbine engine of claim 1, wherein the steam system further includes:
a condenser located downstream of the combustor to condense water from the combustion gases and to generate an exhaust-water mixture; and
a water separator located downstream of the condenser, the water separator separating the water from the exhaust-water mixture, the water separator being the steam hot gas path component.

7. The turbine engine of claim 6, wherein the steam system further includes a boiler located downstream of the combustor, the boiler receiving water and being fluidly connected to the combustor to receive the combustion gases and to boil the water to generate steam,
wherein the condenser is located downstream of the boiler to receive the combustion gases from the boiler, and
wherein the water separator is fluidly connected to the boiler to provide the water to the boiler.

8. The turbine engine of claim 1, wherein the steam hot gas path component is a heat exchanger.

9. The turbine engine of claim 8, wherein the heat exchanger includes a wall at least partially defining a combustion-gas passage, the combustion-gas passage being a part of the hot gas path and the hydrophobic coating being formed on the wall.

10. The turbine engine of claim 9, wherein the heat exchanger is a plate heat exchanger having at least one plate including the wall.

11. The turbine engine of claim 9, wherein the heat exchanger is a tube and shell heat exchanger having a tube including the wall.

12. The turbine engine of claim 11, wherein the combustion-gas-facing surface defines the combustion-gas passage within an interior of the tube.

13. The turbine engine of claim 9, wherein the wall separates the combustion-gas passage from a second heat exchange fluid passage for a second heat exchange fluid.

14. The turbine engine of claim 13, wherein the wall includes a second-heat-exchange-fluid-facing surface facing the second heat exchange fluid passage and another hydrophobic coating is formed on the second-heat-exchange-fluid-facing surface.

15. The turbine engine of claim 13, wherein the steam system includes a boiler located downstream of the combustor, the boiler receiving water and being fluidly connected to the combustor to receive the combustion gases and to boil the water to generate steam,
wherein the boiler is the heat exchanger and the second heat exchange fluid passage is a water/steam passage through which the water flows.

16. The turbine engine of claim 13, wherein the steam system includes a condenser located downstream of the combustor to condense water from the combustion gases and to generate an exhaust-water mixture, the condenser being the heat exchanger.

17. The turbine engine of claim 9, wherein the wall separates the combustion-gas passage from a cooling air passage for a cooling air.

18. The turbine engine of claim 17, wherein the wall includes fins formed on a surface of the wall facing the cooling air passage.

19. The turbine engine of claim 17, wherein the steam system includes a condenser located downstream of the combustor to condense water from the combustion gases and to generate an exhaust-water mixture, the condenser being the heat exchanger.

20. The turbine engine of claim 19, further comprising a fan including a plurality of blades, a first portion of air flowing into the fan flows through a bypass airflow passage as bypass air and a second portion of the air flowing into the fan flows through the core air flow path as core air,
wherein the condenser is positioned in the bypass airflow passage and the bypass air is the cooling air.

* * * * *